United States Patent [19]

Fabbri

[11] Patent Number: 4,696,199

[45] Date of Patent: Sep. 29, 1987

[54] ANGLE DRIVE TRANSMISSION UNIT PARTICULARLY FOR AGRICULTURAL MACHINERY

[75] Inventor: Fabrizio Fabbri, Modena, Italy

[73] Assignee: COMER S.p.A., Villanova Di Reggiolo, Italy

[21] Appl. No.: 812,022

[22] Filed: Dec. 23, 1985

[30] Foreign Application Priority Data

Jan. 8, 1985 [IT] Italy .................. 20421/85[U]

[51] Int. Cl.[4] .................. F16H 1/14; F16H 57/02
[52] U.S. Cl. .................. 74/417; 74/606 R
[58] Field of Search ............ 74/416, 417, 423, 606 R; 81/57.13, 57.29

[56] References Cited

U.S. PATENT DOCUMENTS

| | | | |
|---|---|---|---|
| 2,804,957 | 9/1957 | Pechin, Jr. | 74/417 X |
| 2,997,894 | 8/1961 | Klein | 74/423 X |
| 3,817,115 | 6/1974 | Schnizler et al. | 74/417 |

FOREIGN PATENT DOCUMENTS

| | | | |
|---|---|---|---|
| 985 | of 1898 | United Kingdom | 74/417 |
| 665158 | 5/1979 | U.S.S.R. | 74/417 |

*Primary Examiner*—Allan D. Herrmann
*Attorney, Agent, or Firm*—Guido Modiano; Albert Josif

[57] ABSTRACT

The angle drive transmission unit comprises a box-like housing defining first and second chambers in communication with each other and accommodating respectively an input shaft and an output shaft perpendicular to each other and carrying respectively first and second bevel gears in mutual mesh engagement. A peculiar feature of the invention is that the bearing associated with the inward end of the input shaft is carried in a seat defined by a closure cover of the box-like housing and detachably affixed to the box-like housing through elastically deformable means.

8 Claims, 2 Drawing Figures

4,696,199

ANGLE DRIVE TRANSMISSION UNIT PARTICULARLY FOR AGRICULTURAL MACHINERY

BACKGROUND OF THE INVENTION

This invention relates to an angle drive transmission unit particularly for agricultural machinery.

As is known in agricultural machines, and especially shrub clearing and the like machines, right-angle drives have been used which comprise essentially an input shaft with a substantially perpendicular axis to the output shaft whereto a tool or the like is fitted.

Conventional drives generally include a cast outer housing wherein seats are machined for the two right-angle drive shaft's bearings.

A part of the bearing's housing is instead machined in the closure cover of the box-type housing, which involves mechanical complexity and relatively long assembly time because the covers are fastened to the box-type housing by means of screws.

In another prior implementation, forming the subject of the prior U.S. patent application Ser. No. 06/640,647, now abandoned, by this same Applicant, there is provided a drive assembly configured to have all the bearing seats formed in the inner walls of the box-like housing, thereby the closure cover merely serves to prevent oil from leaking out.

That implementation, while being satisfactory on the whole, has, however, the limitation that it disallows preassembling of the gears to the shafts, because the gears must be keyed or otherwise secured to the shafts after the shafts have been introduced into the box-type housing.

SUMMARY OF THE INVENTION

It is the aim of this invention to obviate such prior problems by providing an angle drive transmission unit particularly for agricultural machinery which affords preassembly of the gears to the shafts, while speeding up the drive assembly procedure, without involving the use of screws for affixing the closure cover and cast covers.

Within the above aim, it is a particular object of the invention to provide an angle drive transmission unit whereby the input and output shafts can be preassembled, thereby they can be made readily available from warehouses, and then installed into the box-like housing without using screws.

Another object of the invention is to provide an angle drive transmission unit which by virtue of its peculiar construction, can give full assurance of being reliable and safe to use.

A not least object of the invention is to provide an angle drive transmission unit which can be readily formed from commercially available elements and materials and is highly competitive from a purely economic standpoint.

The above aim, as well as these and other objects to become apparent hereinafter, are achieved by an angle drive transmission unit particularly for agricultural machinery, according to the invention, comprising a box-like housing defining first and second chambers in communication with each other and accommodating respectively an input shaft and an output shaft perpendicular to each other and carrying respectively first and second bevel gears in mutual mesh engagement, there being also provided bearings for supporting said shafts, characterized in that the bearing associated with the inward end of said input shaft is carried in a seat defined by a closure cover for said box-like housing detachably securable to said box-like housing through elastically deformable means.

BRIEF DESCRIPTION OF THE DRAWINGS

Further features and advantages will be more clearly apparent from the following detailed description of an angle drive transmission unit as shown by way of illustration and not of limitation in the accompanying drawing, where.

DESCRIPTION OF THE PREFERRED EMBODIMENTS

Figures 1, 2:
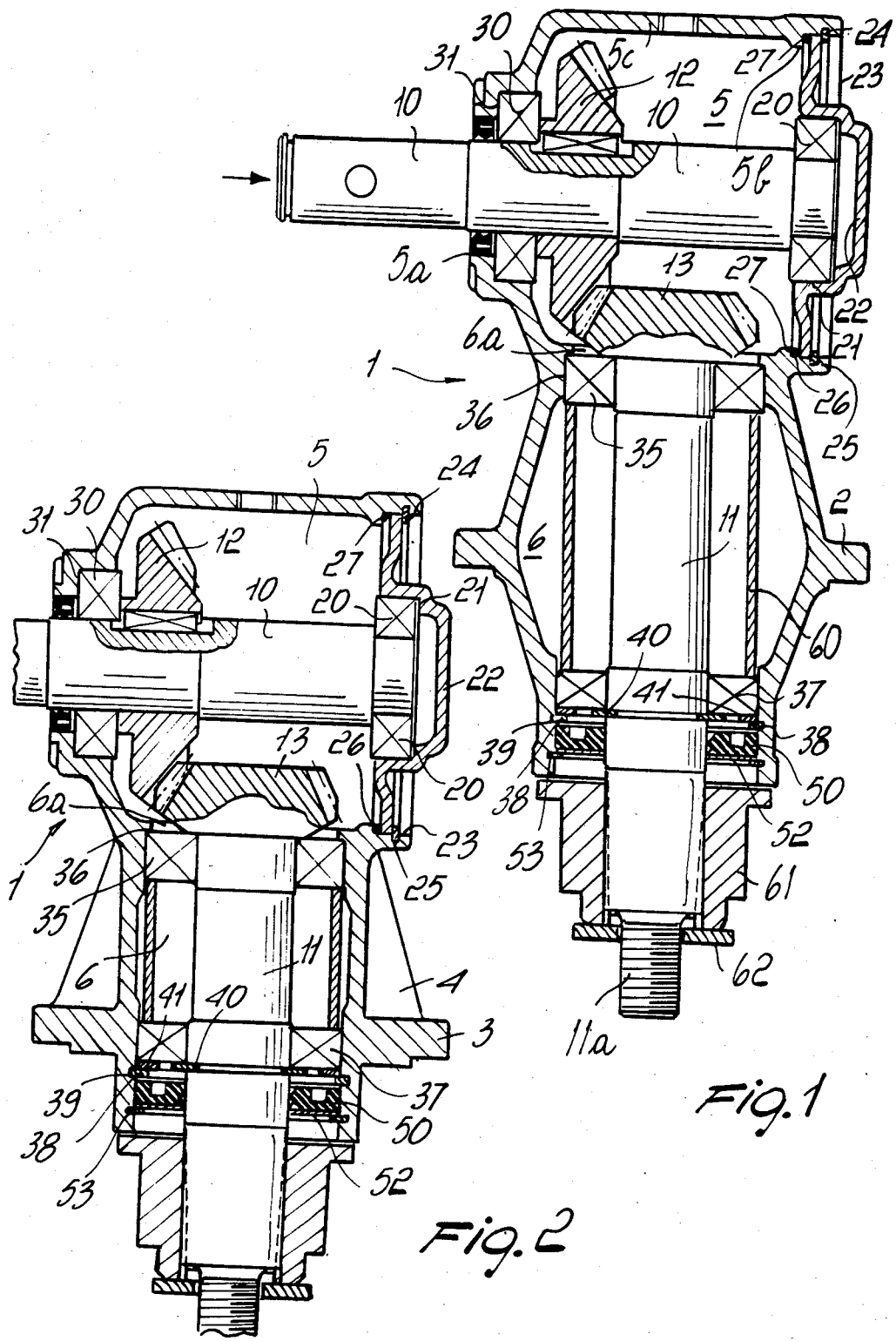
FIG. 1 is a sectional view of the angle drive transmission unit of this invention.
FIG. 2 is a sectional view of an angle drive transmission unit with a mounting flange formation strengthened by ribs.

With reference to the drawing figures, this angle drive transmission unit particularly intended for agricultural machinery, such as shrub clearing and the like machines, comprises a box-like housing 1 which, as shown in FIG. 1, has a substantially elongate shape with a flange formation 2 on a middle portion thereof; likewise the box-like housing, again indicated at 1, shown in FIG. 2 has a flange formation 3 with outer stiffening ribs 4.

The box-like housing may have, of course, any other shape suiting contingent needs, and forms no part of this invention.

The box-like housig 1 defines on its inside a first chamber 5 extending in a widthwise axis direction and a second chamber 6 extending in a lengthwise axis direction and which communicate with each other at an open end 6a of the second chamber and accommodate respectively an input shaft indicated at 10 and an output shaft indicated at 11, substantially perpendicular to each other.

The first chamber has a front side 5a, a back side 5b and a lateral side 5c surrounding said first chamber.

Keyed to the input shaft 10 is a first bevel gear 12 which meshes with a second bevel gear 13 keyed to, or integral with, the output shaft 11.

An important peculiarity of the invention is that the bearing 20 at the inward end of the input shaft 10 is accommodated in an annular seat 21 which is defined in a closure cover or lid 22 advantageously formed from deep drawn sheet metal and expediently secured in a lead-in seat 23 defined by an aperture in the box-like housing 1, by means of elastically deformable means advantageously comprising a resilient retainer ring 24 which fits into a groove 25 defined in the lead-in seat 23.

As visible from the drawing the aperture defined by the lead-in seat 23 has an opening area allowing passage therethrough of said first bevel gear 12.

The closure cover 22 acts on a sealing gasket 26 accommodated on a ledge 27 defined at the end of the lead-in seat 23.

The shaft 10 is then supported by additional bearings, generally indicated at 30, which are accommodated, in a manner known per se, in a seat 31 defined on the inside of the box-like housing 1.

It should be emphasized that the bearing 20, which is accommodated on the closure cover 22, is the least stressed bearing because of the fact that it is the farthest from the bevel gear 12 which transmits the motion to the bevel gear 13.

The output shaft 11 is mounted similarly in the second chamber 6 and for this purpose, an upper bearing 35 is accommodated in an annular seat 36 defined at the open end 6a of the second chamber 6 by the box-like housing 1 in the merging region between the first chamber 5 and second chamber 6, and a lower bearing 37 which is held in place by a lower retaining ring 38, expediently an elastic or elastically deformable ring, accommodated in a groove 39 defined on the inside of the angle housing.

Thus, the second shaft 11 can also be positioned without using screws and has a sleeve 60 for holding in place the bearing 35 and the bearing 37.

It should be added, for completeness of description, that on the shaft 11 there is provided an inner ring 40 lying on the inward side of the lower bearing 37.

Further, to better distribute the stresses acting between the lower retaining ring 38 and lower bearing 37, a washer 41 is provided between the bearing 37 and ring 38.

From the drawing it appears clear that the aperture area defined by the opening 6a of the second chamber 6 allows passage therethrough of the second bevel gear 13.

Advantageously, below the retaining ring 38, there is provided an oil seal 50 which is protected, at its lower portion, by a piece or member of sheet metal or other suitable material 52 advantageously held in place by a retaining ring. The oil seal 50 is also additionally protected by a sleeve 61, which (as visible by dotted lines in FIGS. 1 and 2) is force fitted onto a lower portion of the shaft 11, and retained thereon by a threaded washer 62, adapted for screw thread engagement relationship with a threaded extension 11a of the shaft 11.

The sheet metal piece or member 52 serves to adequately protect the oil seal in that it is located in an area confronting the working area and could be swept by debris or the like elements and be damaged.

It may be appreciated from the foregoing description that the invention achieves its objects, and in particular the fact should be emphasized that the input shaft 10, and its respective gear, and the output shaft 11 with its respective gear can be preassembled and mounted in the box-like housing in their preassembled state and secured in position as desired by the mere use of retaining rings which secure in place the respective bearings.

This is of considerable importance because it greatly simplifies all of the manufacturing steps, not requiring the adoption of cast and machined covers to form the seats, and appreciably facilitates any servicing operation.

Another important facet of the invention is that the whole unit can be assembled without using screws, and that a perfect seal is provided at the closure cover by having the sheet metal piece which forms the cover to directly compress the annular gasket.

It should be further emphasized that the closure cover is provided at the least stressed bearing.

A retainer ring is then provided on the output shaft which has a load-bearing function and holds the output shaft in place without compulsorily requiring complicated covers or bushes, as is the case instead with prior art approaches.

In practicing the invention, the materials used, as long as compatible with the specific application, and the dimensions and contingent shapes may vary according to necessity.

I claim:

1. An angle drive transmission unit particularly for agricultural machinery, comprising:
   a box like housing having a longitudinal and a widthwise extension, said housing defining therein a first and a second chamber arranged in longitudinal succession to and in communication with each other,
   an input shaft arranged in said first chamber,
   an output shaft arranged in said second chamber,
   said input shaft and said output shaft being arranged transverse to each other,
   a first bevel gear carried by said input shaft,
   a second bevel gear carried by said output shaft,
   said first and said second bevel gears being in mutual mesh engagement,
   bearings arranged in said housing for said input and said output shafts,
   at least one removable lid member in said housing for closing one of said chambers, said lid member having seat formations for accommodating therein one of said bearings,
   an elastically deformable retainer member for detachably affixing said removable lid member to said housing.

2. An angle drive transmission unit particularly for agricultural machinery, comprising,
   a box like housing having a longitudinal and a widthwise extension direction, said housing defining therein:
   a first chamber extending in said widthwise direction and having a widthwise axis thereof, said first chamber having further a front side with an internal first seat formation, a back side opposite said front side and a lateral side surrounding laterally said first chamber, an aperture towards outside in said first chamber at said back side and coaxial with said widthwise axis,
   a lid member removably closing said aperture, said lid member having an internal surface defining a second seat formation, said first and said second seat formation being coaxial with said widthwise axis when said lid member is in its assembled position, and detachable retaining means for removably maintaining said lid member in closed position thereof,
   a second chamber extending in a longitudinal direction and having a longitudinal axis thereof extending transverse to said widthwise axis, said second chamber having one open end thereof opening laterally into said first chamber at said lateral side thereof and an opposite end at a distance from said one end thereof, said second chamber having a third annular seat formation at said one open end thereof and a fourth annular seat formations at said opposite end thereof, said third annular seat formation and said fourth annular seat formation being coaxial with said longitudinal axis,
   an input shaft arranged in said first chamber coaxial with said widthwise axis, first bearing means received in said first seat formation for said input shaft and second bearing means received in said second seat formation for said input shaft, a first bevel gear rigid with said input shaft near said second bearing means, an output shaft arranged in said second chamber coaxial with said longitudinal axis and having an end portion thereof facing said first chamber through said one end thereof, a third bearing received in said annular seat formation for said output shaft and a fourth bearing received in said fourth annular formation for said output shaft, a second bevel gear on said end portion of said output shaft coaxial with said longitudinal axis and extending into said first chamber and in mesh engagement with said first bevel gear.

3. A device according to claim 2, further comprising a sleeve member between said third and said fourth bearings to maintain said third and said fourth bearings within said third and said fourth seat formations.

4. A device according to claim 2, wherein said aperture of said first chamber has an opening area allowing passage therethrough of said first bevel gear on said input shaft.

5. A device according to claim 2, wherein said one open end of said second chamber has an opening area allowing passage therethrough of said second bevel gear on said output shaft.

6. A device according to claim 2, wherein said retainer member is a resilient retainer ring.

7. A device according to claim 2, wherein said lid member is formed from deep drawn sheet metal defining said second seat formation.

8. A device according to claim 2, wherein between said lid member and said aperture a sealing gasket is comprised for sealingly closing said aperture.

* * * * *